(12) United States Patent
Crews

(10) Patent No.: US 6,706,769 B2
(45) Date of Patent: Mar. 16, 2004

(54) AMINOCARBOXYLIC ACID BREAKER COMPOSITIONS FOR FRACTURING FLUIDS

(75) Inventor: James B. Crews, Willis, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 10/086,963

(22) Filed: Feb. 28, 2002

(65) Prior Publication Data

US 2003/0162844 A1 Aug. 28, 2003

(51) Int. Cl.[7] .............................. C09K 3/00; E21B 43/00
(52) U.S. Cl. ........................ 516/113; 507/211; 507/241; 507/921
(58) Field of Search ................... 516/113; 507/211, 507/241, 921

(56) References Cited

U.S. PATENT DOCUMENTS

| | | | |
|---|---|---|---|
| 4,250,044 A | 2/1981 | Hinkel | |
| 4,486,339 A | 12/1984 | Young | 252/180 |
| 4,874,854 A | * 10/1989 | Colegrove et al. | 252/603 |
| 4,968,442 A | 11/1990 | Falk | 507/241 |
| 4,969,526 A | 11/1990 | Cawiezel | |
| 5,010,954 A | 4/1991 | Falk | 166/295 |
| 5,054,552 A | * 10/1991 | Hall et al. | 507/241 |
| 5,223,159 A | 6/1993 | Smith et al. | 507/241 |
| 5,224,546 A | 7/1993 | Smith et al. | 507/241 |
| 5,310,489 A | 5/1994 | Sharif | 507/903 |
| 5,624,886 A | 4/1997 | Dawson et al. | 507/241 |
| 5,950,731 A | 9/1999 | Schuchart et al. | 507/921 |
| 5,981,447 A | 11/1999 | Chang et al. | 507/271 |
| 6,265,355 B1 | 7/2001 | Lai et al. | 507/237 |

OTHER PUBLICATIONS

J. S. Rhudy, "Removal of Mineral Scale From Reservoir Core by Scale Dissolver," SPE International Symposium on Oilfield Chemistry, New Orleans, LA, Mar. 2–5, 1993, pp. 97–106.
Wayne W. Frenier, "Novel Scale Removers Are Developed for Dissolving Alkaline Earth Deposits," 2001SPE International Symposium on Oilfield Chemistry, Houston, TX, Feb. 13–16, 2001.
Akzo Nobel Dissolvine(R) Chelates Web pages downloaded Aug. 10, 2001, http://www.dissolvine.com/start.htm.
Dow Chemical Company Versene(R) Chelating Agents Web pages downloaded Aug. 10, 2001, http://www.dow.com/versene/index.htm.

* cited by examiner

Primary Examiner—Daniel S. Metzmaier
(74) Attorney, Agent, or Firm—Madan, Mossman & Sriram, P.C.

(57) ABSTRACT

It has been discovered that aminocarboxylic acids are effective breakers for polymer-gelled aqueous fracturing fluids, particularly in the temperature range between about 120° F. (49° C.) and about 280° F. (138° C.). The aminocarboxylic acids are believed to act directly on the polymer and not to any great extent or not to as an effective extent on a crosslinking agent, if present. The polymer may be a polysaccharide, and the aminocarboxylic acid may be selected from the group including, but not necessarily limited to, tetrasodium ethylenediaminetetraacetic acid ($Na_4EDTA$), tetrasodium propylenediaminetetraacetic acid ($Na_4PDTA$), trisodium hydroxyethylenediaminetetraacetic acid ($Na_4HEDTA$), trisodium nitrilotriacetic acid ($Na_3NTA$), salts of these acids, and mixtures thereof.

15 Claims, 4 Drawing Sheets

AMINOCARBOXYLIC ACID BREAKER COMPOSITIONS FOR FRACTURING FLUIDS

FIELD OF THE INVENTION

The present invention relates to gelled treatment fluids used during hydrocarbon recovery operations, and more particularly relates, in one embodiment, to methods of "breaking" or reducing the viscosity of treatment fluids containing polymer gelling agents used during hydrocarbon recovery operations.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid. However, crosslinking agents are not always necessary to obtain a suitable gel.

The recovery of fracturing fluids may be accomplished by reducing the viscosity of the fluid to a low value so that it may flow naturally from the formation under the influence of formation fluids. Polymer gels generally require viscosity breakers to be injected to reduce the viscosity or "break" the gel. Enzymes, oxidizers, and inorganic acids are known polymer viscosity breakers. Enzymes are effective within a pH range, typically a 2.0 to 10.0 range, with increasing activity as the pH is lowered towards neutral from a pH of 10.0.

Many viscosity-breaking technologies are most effective only over limited temperature ranges. For instance, persulfate oxidizers are generally too reactive to be properly used above about 140° F. (60° C.) and bromate oxidizers do not work until about 220° F. (104° C.) and above. Enzyme technology generally works between about 150 to 220° F. (66 to 104° C.).

It would be desirable if a viscosity breaking system could be devised to break fracturing fluids gelled with polymers, particularly over a temperature range of about 120° F. (49° C.) and about 280° F. (138° C.), as an alternative to enzyme technology.

SUMMARY OF THE INVENTION

Accordingly, it is an object of the present invention to provide a method for breaking the viscosity of aqueous treatment fluids gelled with polymers used in hydrocarbon recovery operations.

It is another object of the present invention to provide a composition and method for breaking gelled aqueous fluids over a temperature range of about 120° F. (49° C.) and about 280° F. (138° C.).

Still another object of the invention is to provide a method and composition for breaking the viscosity of aqueous fluids gelled polymers using relatively inexpensive aminocarboxylic acids.

In carrying out these and other objects of the invention, there is provided, in one form, a method for breaking the viscosity of polymer gelled aqueous fluids comprising adding an effective amount of at least one aminocarboxylic acid to act directly break down the gel.

DETAILED DESCRIPTION OF THE INVENTION

Figure 1:
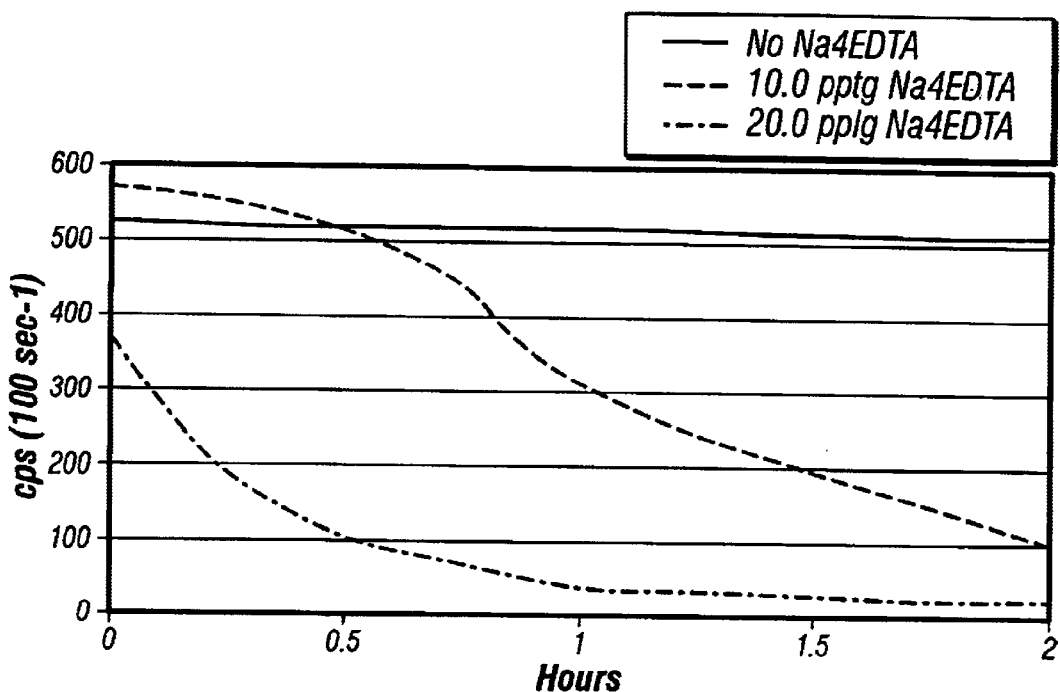
FIG. 1 is a graph of the effects of different amounts of $Na_4EDTA$ on a BoraFRAQ® 30 borate crosslinked polymer gel at 150° F. (66° C.)

Aminocarboxylic acids have been manufactured for several decades. Their primary use has been the chelation of cations. It has now been discovered that PDTA, EDTA, HEDTA and other aminocarboxylic acids and their salts can be used to directly break the polymer in gelled fracturing fluids, particularly at temperatures between about 120° F. (49° C.) and about 280° F. (138° C.). While these agents can be used to break the polymer gel in crosslinked polysaccharide fracturing fluids, they can also be used to break other polysaccharide polymer fluids that do not employ crosslinkers. As will be shown, it is believed that these aminocarboxylic acids act directly on the polymer itself, and not the crosslinking ion, although it is acceptable if the aminocarboxylic acids also act on the crosslinker. The gel breaking method of this invention is expected to be an attractive alternative to using enzyme technology or catalyzed oxidizer technology to break gels within this temperature range.

In order to practice the method of the invention, an aqueous fracturing fluid is first prepared by blending a hydratable polymer into an aqueous fluid. The aqueous fluid could be, for example, water, brine, aqueous based foams or water-alcohol mixtures. Any suitable mixing apparatus may be used for this procedure. In the case of batch mixing, the hydratable polymer and the aqueous fluid are blended for a period of time sufficient to form a hydrated solution. The hydratable polymer that is useful in the present invention can be, but is not necessarily limited to, any of the hydratable polysaccharides having galactose or mannose monosaccharide components and are familiar to those in the well service industry. These polysaccharides are capable of gelling in the presence of a crosslinking agent to form a gelled base fluid, although as noted it is not necessary that the polymer be crosslinked. For instance, suitable hydratable polysaccharides are the galactomannan gums, guars and derivatized guars, as non-limiting examples. Specific examples are guar gum and guar gum derivatives. The preferred gelling agents are guar gum, hydroxypropyl guar and carboxymethyl hydroxypropyl guar. The most preferred hydratable polymers for the present invention are guar gum and carboxymethyl hydroxypropyl guar and hydroxypropyl guar, in one non-limiting case.

The amount of polysaccharide included in the fracturing fluid is not particularly critical so long as the viscosity of the fluid is sufficiently high to keep the proppant particles suspended therein during the fluid injecting step. Thus, depending on the application, the hydratable polymer is added to the aqueous fluid in concentrations ranging from about 15 to 60 pounds per thousand gallons (pptg) by volume of the total aqueous fluid (1.8 to 7.2 kg/m$^3$). The most preferred range for the present invention is about 20 to about 40 pptg (2.4 to 4.8 kg/m$^3$).

In addition to the hydratable polymer, the fracturing fluids of the invention include a borate crosslinking agent. The crosslinking agent can be any of the conventionally used borate crosslinking agents that are known to those skilled in the art. This includes any of the boron salts or boric acid as borate crosslinking agents. Guar and derivatized guar gels, which are crosslinked by the addition of borate ion donating materials are preferred within this embodiment over other crosslinking agents because they clean up faster and yield higher sand pack permeability than guar gels crosslinked with other crosslinking agents. However, other crosslinking agents that can be used with this embodiment besides borate, may include, but are not limited to, titanate, zirconate, and other metallic and semi-metallic high pH crosslinkers.

In the case of borate crosslinkers, the crosslinking agent is any material that supplies borate ions in solution. The amount of borate ions in solution is dependent on pH. Thus, the crosslinking agent can be any convenient source of borate ions, for instance the alkali metal and the alkaline earth metal borates and boric acid. A preferred crosslinking additive is preferably a common type of borax present in the range from about 0.25 to in excess of 10.0 pptg of the total aqueous fluid (0.03 to in excess of 1.2 lb/m$^3$). Preferably, the concentration of crosslinking agent is in the range from about 1.0 to about 3.0 pptg (0.12 to 0.34 kg/m$^3$) by volume of the total aqueous fluid. Similar considerations apply to the use of other crosslinkers.

Propping agents are typically added to the base fluid just prior to the addition of the crosslinking agent. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120–1700 kg/m$^3$) of fracturing fluid composition, but higher or lower concentrations can be used as the fracture design requires. The base fluid can also contain other conventional additives common to the well service industry such as surfactants, biocides, non-emulsifiers and the like.

In general, and in one non-limiting embodiment of the invention, the method is conducted at a temperature between about 120° F. (49° C.) and about 280° F. (138° C.), preferably between about 150° F. (66° C.) and about 260° F. (127° C.).

In one non-limiting embodiment of the invention, the suitable aminocarboxylic acids for use in the invention that are suitable include, but are not limited to, tetrasodium ethylenediaminetetraacetic acid (Na$_4$EDTA), tetrasodium propylenediaminetetraacetic acid (Na$_4$PDTA), trisodium hydroxyethylenediaminetetraacetic acid (Na$_4$HEDTA), trisodium nitrilotriacetic acid (Na$_3$NTA), trisodium ethylenediaminetriacetic acid (Na$_3$HEDTA), disodium ethylenediaminediacetic acid (Na$_2$H$_2$EDDA), disodium calcium dihydrate ethylenediaminediacetic acid (Na$_2$Ca.2H$_2$O EDTA), tetraammonium ethylenediaminetetraacetic acid (NH$_4$)$_4$EDTA and potassium and ammonium and other salts of these acids, the acids alone, and mixtures thereof. When salts are employed, alkali metal and ammonium salts are preferred and sodium, potassium and ammonium salts are particularly preferred, in a non-limiting embodiment. Of course, any aminocarboxylic acid that performs the functions required of these breakers may be used within the scope of this invention. All of these aminocarboxylic acids were discovered to break polymer gels by themselves.

More particularly, and in non-limiting embodiments of the invention, Na$_4$EDTA breaks borate crosslinked guar at from about 120° F. (49° C.) to about 220° F. (104° C.); where the optimum temperature application is from about 130° F. (54° C.) to about 200° F. (93° C.). Na$_4$PDTA was found to break borate crosslinked guar at from about 140° F. (60° C.) to about 230° F. (110° C.); where the optimum temperature application is from about 150° F. (66° C.) to about 210° F. (99° C.). In turn, Na$_4$HEDTA was found to break borate crosslinked guar at from about 180° F. (82° C.) to about 280° F. (138° C.); where the optimum temperature application is from about 190° F. (88° C.) to about 240° F. (116° C.).

It was discovered that pentasodium diethylenetriaminepentaacetic acid (Na$_5$DTPA) and disodium hydroxyethyliminodiacetic acid (Na$_2$HEIDA) did not effectively break polymer fluids by themselves.

Any or all of the above aminocarboxylic acids may be provided in an extended release form such as encapsulation by polymer or otherwise, pelletization with binder compounds, absorbed on a porous substrate, and a combination thereof. Specifically, the materials may be encapsulated to permit slow or timed release of the aminocarboxylic acid materials. In non-limiting examples, the coating material may slowly dissolve or be removed by any conventional mechanism, or the coating could have very small holes or perforations therein for the material within to diffuse through slowly. For instance, polymer encapsulation coatings such as used in fertilizer technology available from Scotts Company, specifically POLY-S® product coating technology, or polymer encapsulation coating technology from Fritz Industries could possibly be adapted to the methods of this invention.

It is difficult, if not impossible, to specify with accuracy the amount of the aminocarboxylic acid that should be added to a particular polymer gelled aqueous fluid to fully break the gel, in general. For instance, a number of factors affect this proportion, including but not necessarily limited to, the particular polymer used to gel the fluid; the particular aminocarboxylic acid used to break the gel; the temperature of the fluid; the starting pH of the fluid; whether an enzyme breaker is also used; the particular nature of the enzyme breaker, if present; the concentration of the enzyme; the nature and the concentration of any pH buffers; and the complex interaction of these various factors. Nevertheless, in order to give an approximate feel for the proportions of the aminocarboxylic acid to be used in the method of the invention, the amount of material added may range from about 0.01 to about 20.0 gptg (the same values apply for metric units, e.g. liters per thousand liters or $m^3$/thousand $m^3$), based on the total weight of the fluid; preferably from about 0.1 to about 5.0 gptg, most preferably from about 0.25 to about 2.0 gptg. Both solid and liquid forms of the aminocarboxylic acids may be employed in the compositions and methods of this invention. The aminocarboxylic acids may be applied in a water-based liquid form with up to 50 wt. % active aminocarboxylic acid content. Expressed in dry units, the amount of aminocarboxylic acid added to the polymer gelled aqueous fluids may range from about 0.1 to 30.0 pptg (pounds per thousand gallons) (0.01–3.4 kg $m^3$), preferably from about 0.5 to 10.0 pptg (0.06–1.2 kg/$m^3$).

Figure 6:
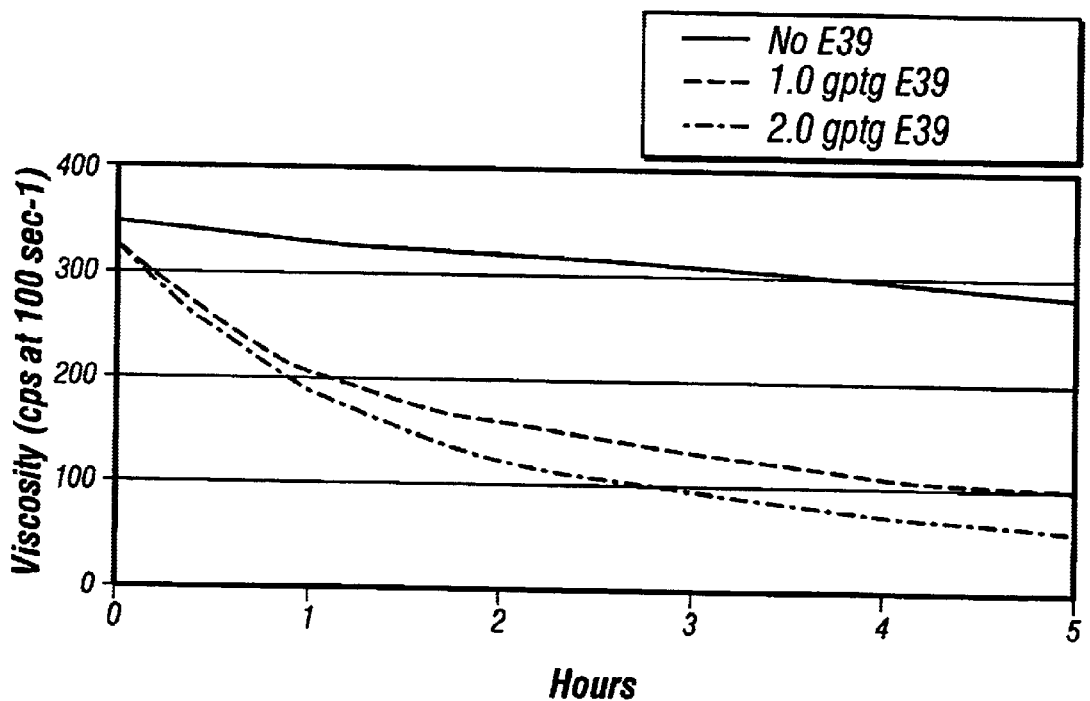
FIG. 6 is a graph of the effects of different amounts of $Na_4EDTA$ (E39 Breaker) on 80 pptg linear guar polymer gel (WG-1L) at 150° F. (66° C.)
Figure 7:
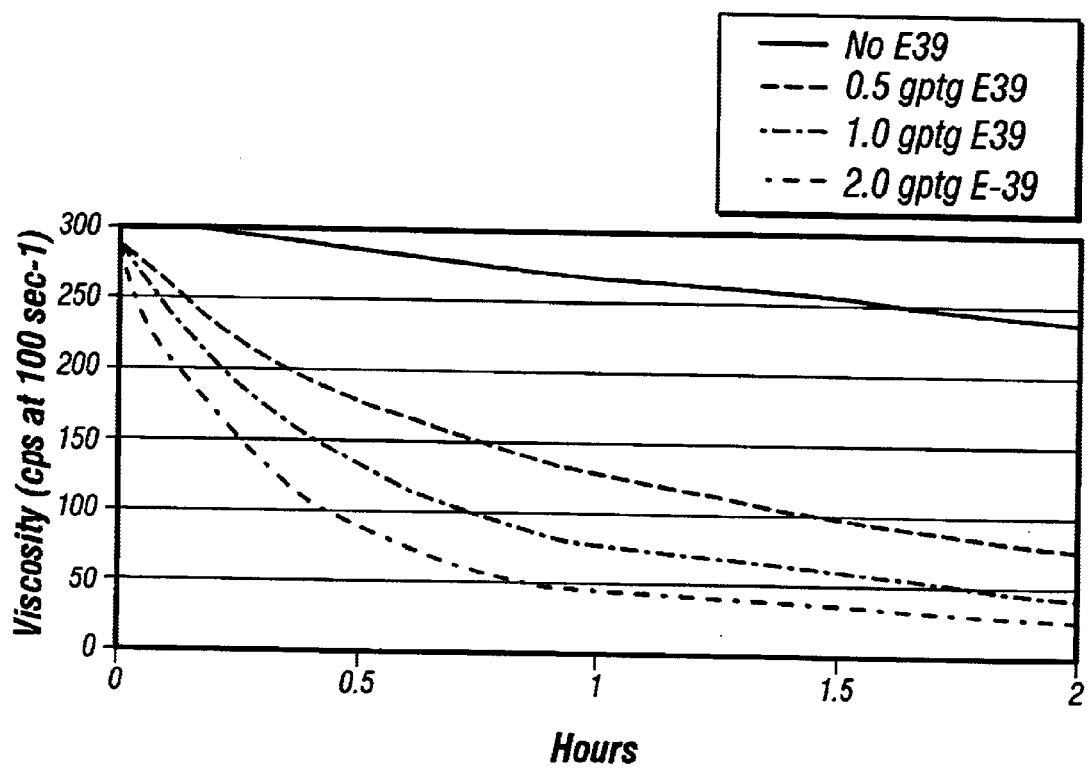
FIG. 7 is a graph of the effects of different amounts of $Na_4EDTA$ (E39 Breaker) on 80 pptg linear guar polymer gel (WG-1L) at 180° F. (82° C.).

As noted, and as will be shown with reference to the various Examples, it is believed that the aminocarboxylic acid breakers of this invention act directly on the polymer itself, and not on any crosslinker that may be present, in accordance with one non-limiting understanding of the invention. In another embodiment of the invention, the aminocarboxylic acid breakers may act both directly to break down the gel by acting upon the polymer itself, and by acting upon the crosslinking ion, if present, although it should be understood that the primary breaking mechanism is the direct action of the aminocarboxylic acid on the polymer. This issue will be discussed further with reference to FIGS. 6 and 7. That is, over half of the effect of the gel breaking can be attributed to the direct action of the aminocarboxylic acid, rather than to any action upon the crosslinker, if any. In one particular non-limiting embodiment of the invention, the polymer is not crosslinked.

In one non-limiting embodiment of the invention, the polymer gel breaker system of this invention has an absence of chlorite compounds. Examples of chlorite compounds explicitly absent include, but are not necessarily limited to, alkali metal chlorite compounds and hypochlorite.

It is typically necessary to add pH buffers to the gelled aqueous fluid to increase the pH to generate active borate ion for crosslinking the polymers, if the polymer is crosslinked. Suitable buffers include, but are not necessarily limited to sodium hydroxide, potassium hydroxide, sodium carbonate, sodium sesquicarbonate, potassium carbonate, sodium bicarbonate, sodium sesquicarbonate, and mixtures thereof. The amount of the pH buffer may range from about 0.5 to about 30.0 pptg (about 0.06 to about 3.6 kg/$m^3$), based on the total volume of the entire fluid, preferably from about 1 to about 20 pptg (about 0.12 to about 2.4 kg/$m^3$).

In a typical fracturing operation, the fracturing fluid of the invention is pumped at a rate sufficient to initiate and propagate a fracture in the formation and to place propping agents into the fracture. A typical fracturing treatment would be conducted by hydrating a 20 lb to 30 lb/1000 gal water (weight/volume) (about 2.4 to about 3.6 kg/$m^3$) glactomannan-based polymer, such as guar, in a 2% (w/v) (166 lb/1000 gal (19.9 kg/$m^3$)) KCl solution at a pH ranging from about 6.0 to about 8.0. For crosslinking, this pH range may be from about 8.8 to about 10.5. The aminocarboxylic acid (or its salt) is added at this stage. It should be understood throughout the specification and claims that more than one aminocarboxylic acid (or its salt) may be employed at a time. During the actual pumping, as described, the pH of the ambient temperature guar gel is raised by the addition of a buffer to about 9.5 to about 12.5, followed by the addition of the aminocarboxylic acid breaker, crosslinking agent, proppant, and other additives, if required.

The present invention will be explained in further detail in the following non-limiting Examples that are only designed to additionally illustrate the invention but not narrow the scope thereof.

GENERAL PROCEDURE FOR EXAMPLES 1–7

Using a Waring blender, 4.8 mls of BoraFRAQ® fracturing fluid (borate crosslinked guar gum system available from Baker Hughes) was hydrated for 15 minutes within 500 mls of distilled water containing 10 grams KCl salt. An aminocarboxylic acid such as 10.0 pptg of Na$_4$EDTA (1.2 kg/$m^3$) was added to the hydrated guar fluid. Control samples of the guar polymer fluid were mixed without adding any aminocarboxylic acid Each sample was capped and shaken vigorously for 60 seconds. The samples were placed in a water bath at the indicated temperatures and visually observed every 30 minutes for viscosity reduction difference between the samples. The samples with aminocarboxylic acid (e.g. Na$_4$EDTA) lost viscosity noticeably faster. Most gel breaking occurred over the first two hours. Modifications to this general procedure are indicated.

Example 1

Example 1 tested Na$_4$EDTA at 10.0 pptg (1.2 kg/$m^3$) and 20.0 pptg (2.4 kg/$m^3$) levels in BoraFRAQ® 30 borate crosslinked polymer gel at 150° F. (66° C.). The results are compared against a fluid without using an aminocarboxylic acid as plotted in FIG. 1. It may be seen that the viscosity of the gel was broken quickly with this aminocarboxylic acid (about 0.5 hour), particularly at the 20.0 pptg (2.4 kg/m$^3$) dosage.

Example 2

Figure 2:
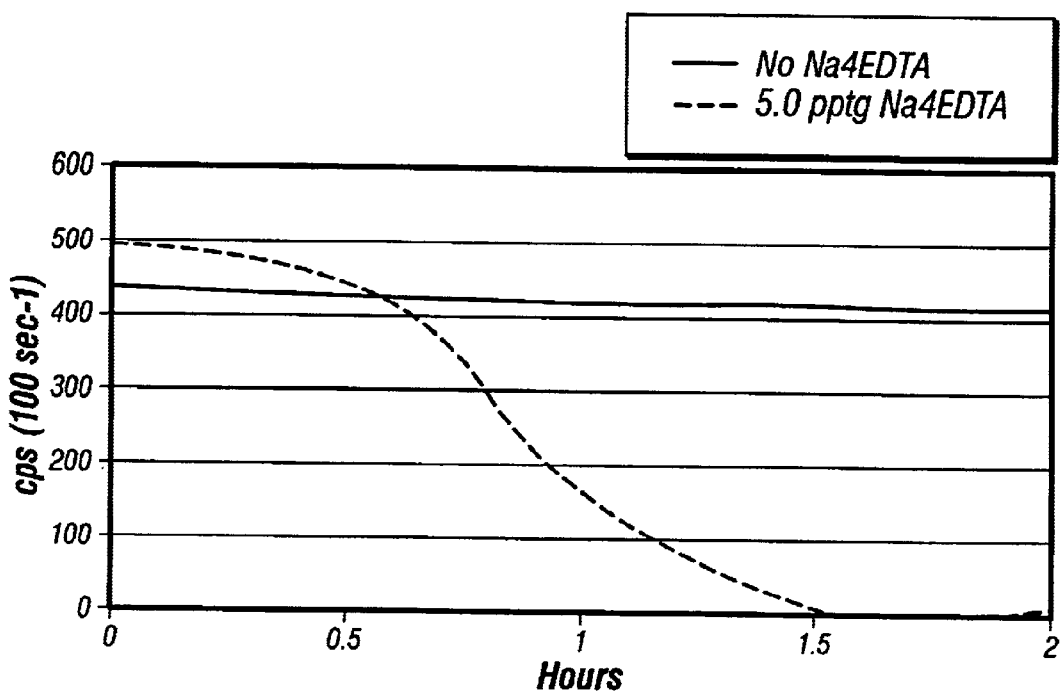
FIG. 2 is a graph of the effect of $Na_4EDTA$ on a BoraFRAQ® 30 borate crosslinked polymer gel at 175° F. (79° C.)

Example 2 tested Na$_4$EDTA at the 5.0 pptg (0.6 kg/m$^3$) level in BoraFRAQ® 30 borate crosslinked polymer gel at 175° F. (79° C.). The results are compared against a fluid without using an aminocarboxylic acid as plotted in FIG. 2. It may be seen that the viscosity of the gel was broken quickly and substantially after about 1 hour with this aminocarboxylic acid salt.

Example 3

Figure 3:
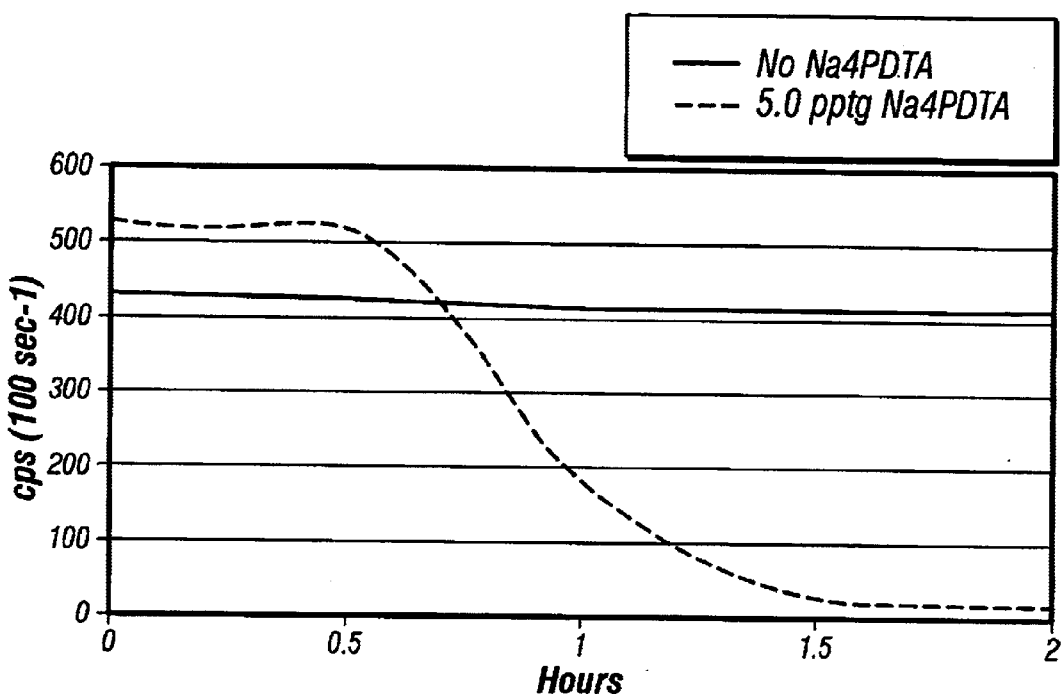
FIG. 3 is a graph of the effect of $Na_4PDTA$ on a BoraFRAQ® 30 borate crosslinked polymer gel at 175° F. (79° C.)

Example 3 tested Na$_4$PDTA at the 5.0 pptg (0.6 kg/m$^3$) level in BoraFRAQ® 30 borate crosslinked polymer gel at 175° F. (79° C.). The results are compared against a fluid without using an aminocarboxylic acid salt as plotted in FIG. 3. It may be seen that the viscosity of the gel was broken quickly and substantially after about 1 hour with this aminocarboxylic acid salt.

Example 4

Figure 4:
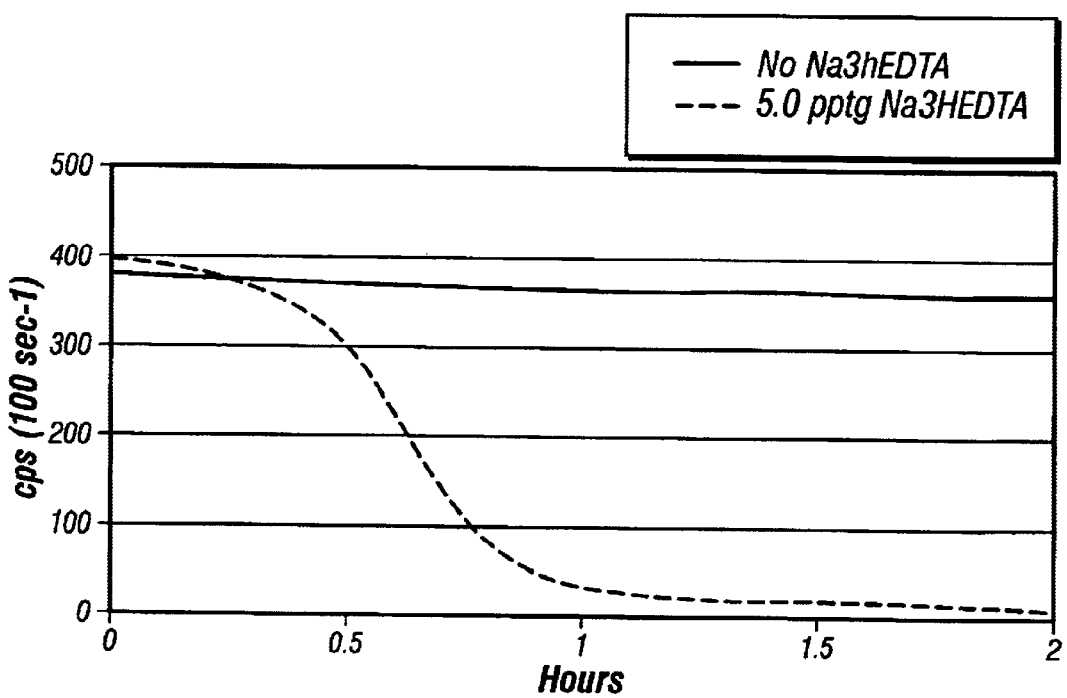
FIG. 4 is a graph of the effect of $Na_3HEDTA$ on a BoraFRAQ® 30 borate crosslinked polymer gel at 220° F. (104° C.)

Example 4 tested Na$_4$HEDTA at the 5.0 pptg (0.6 kg/m$^3$) level in BoraFRAQ® 30 borate crosslinked polymer gel at 220° F. (104° C.). The results are compared against a fluid without using an aminocarboxylic acid salt as plotted in FIG. 4. It may be seen that the viscosity of the gel was broken quickly and substantially in advance of 1 hour with this aminocarboxylic acid salt.

Example 5

Figure 5:
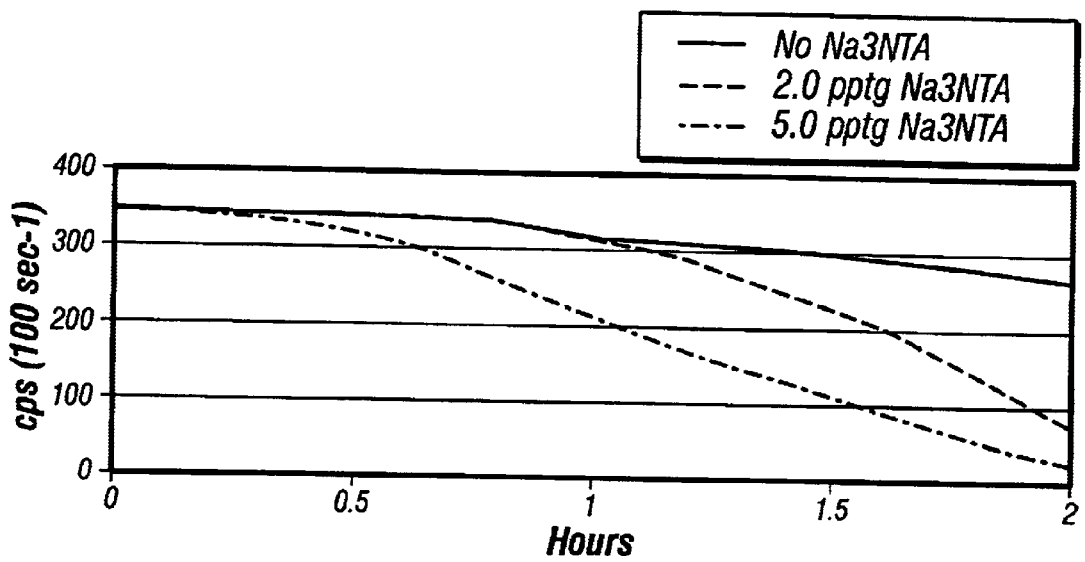
FIG. 5 is a graph of the effects of different amounts of $Na_3NTA$ on a BoraFRAQ® 30 borate crosslinked polymer gel at 250° F. (121° C.)

Example 5 tested Na$_3$NTA at the 2.0 pptg (0.24 kg/m) and 5.0 pptg (0.6 kg/m$^3$) levels in BoraFRAQ® 30 borate crosslinked polymer gel at 250° F. (121° C.). The results are compared against a fluid without using an aminocarboxylic acid salt as plotted in FIG. 5. It may be seen that the viscosity of the gel was broken quickly over the course of 2 hours with this aminocarboxylic acid salt at these dosages.

Example 6

Example 6 tested the effects of E39 Breaker (39% bw aqueous solution of Na$_4$EDTA, available from Akzo Nobel) at the 1.0 gptg and 2.0 gptg levels in 80 pptg (9.6 kg/m$^3$) WG-1 L® non-crosslinked linear guar at 150° F. (66° C.). The results are compared against a fluid without using an aminocarboxylic acid salt as plotted in FIG. 6. It may be seen that the viscosity of the gel broke quickly and substantially over the course of the first 2 hours with this aminocarboxylic acid at these dosages. Because this polymer gel was not crosslinked, this Example demonstrates that the aminocarboxylic acid acts directly and predominantly on the polymer itself, rather than only or substantially on any crosslinker that may be present.

Example 7

Example 7 tested the effects of E39 Breaker at the 0.5 gptg, 1.0 gptg and 2.0 gptg levels in 80 pptg (9.6 kg/m$^3$) WG-1 L® non-crosslinked linear guar at 180° F. (82° C.). The results are compared against a fluid without using an aminocarboxylic acid as plotted in FIG. 7. It may be seen that the viscosity of the gel was broken quickly and substantially over the course of the first hour with this aminocarboxylic acid at these dosages. Because this polymer gel was not crosslinked, this Example also demonstrates that the aminocarboxylic acid acts directly and predominantly on the polymer itself, rather than only or substantially on any crosslinker that may be present.

In the foregoing specification, the invention has been described with reference to specific embodiments thereof, and has been demonstrated as effective in providing a method and composition for a polymer gelled fracturing fluid breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations or amounts of aminocarboxylic acids, crosslinkers, buffers, and other components falling within the claimed parameters, but not specifically identified or tried in a particular composition, are anticipated and expected to be within the scope of this invention. Further, the method of the invention is expected to work at other conditions, particularly temperature conditions, than those exemplified herein.

I claim:

1. A method for breaking the viscosity of aqueous fluids comprising a guar or derivatized guar polymer gel, the method comprising adding an effective amount of at least one aminocarboxylic acid or a salt thereof to act directly on the polymer to break down the gel wherein the polymer gel is not crosslinked.

2. The method of claim 1 where the aminocarboxylic acid is selected from the group consisting of ethylenediaminetetraacetic acid (EDTA), propylenediaminetetraacetic acid (PDTA), hydroxyethylenediaminetetraacetic acid (HEDTA), nitrilotriacetic acid (NTA), ethylenediaminetriacetic acid (HEDTA), ethylenediaminediacetic acid (H$_2$EDDA), dihydrate ethylenediaminediacetic acid (2H$_2$O EDTA), salts of these acids, and mixtures thereof.

3. The method of claim 1 where the aminocurboxylic acid is selected from the group consisting of the sodium salt, the potassium salt, and the ammonium salt of the acid.

4. The method of claim 1 where the method is conducted at a temperature between about 120° F. (49° C.) and about 280° F. (138° C.)

5. The method of claim 1 where in adding the aminocarboxylic acid, the amount of aminocarboxylic acid added ranges from about 0.1 to about 30.0 pptg (from about 0.01 to about 3.4 kg/m$^3$) based on the total volume of fluid.

6. A method for breaking the viscosity of aqueous fluids comprising a guar or derivatized guar polymer gel, the method comprising adding an effective amount of at least one aminocarboxylic acid to act directly and predominantly on the polymer, to break down the gel, where the aminocarboxylic acid is selected from the group consisting of ethylenediaminetetraacetic acid (EDTA), propylenediaminetetraacetic acid (PDTA), hydroxyethylenediaminetetraacetic acid (HEDTA), nitrilotriacetic acid (NTA), ethylenediaminetriacetic acid (HEDTA), ethylenediaminediacetic acid (H$_2$EDDA), dihydrate ethylenediaminediacetic acid (2H$_2$O EDTA), salts of these acids, and mixtures thereof, and where the method is conducted at a temperature between about 120° F. (49° C.) and about 280° F. (138° C.) wherein the polymer gel is not crosslinked.

7. The method of claim 6 where the aminocarboxylic acid is selected from the group consisting of the sodium salt, the potassium salt, and the ammonium salt of the acid.

8. The method of claim 6 where in adding the aminocarboxylic acid, the amount of aminocarboxylic acid added ranges from about 0.1 to about 30.0 pptg (from about 0.01 to about 3.4 kg/m$^3$) based on the total volume of fluid.

9. An aqueous fluid comprising water, at least one guar or derivatized guar polymer capable of forming an aqueous gel; and at least one aminocarboxylic acid or a salt thereof in an amount effective to subsequently act directly on the polymer to break down the gel wherein the aqueous gel is not crosslinked and said aqueous fluid is in the absence of a crosslinker.

10. The fluid of claim 9 where the aminocarboxylic acid is selected from the group consisting of ethylenediaminetetraacetic acid (EDTA), propylenediaminetetraacetic acid (PDTA), hydroxyethylenediaminetetraacetic acid (HEDTA), nitrilotriacetic acid (NTA), ethylenediaminetriacetic acid (HEDTA), ethylenediaminediacetic acid (H$_2$EDDA), dihydrate ethylenediaminediacetic acid (2H$_2$O EDTA), salts of these acids, and mixtures thereof.

11. The fluid of claim 10 where the aminocarboxylic acid is selected from the sodium salt, the potassium salt, and the ammonium salt of the acid.

12. The fluid of claim 9 where in adding the aminocarboxylic acid, the amount of aminocarboxylic acid added ranges from about 0.1 to about 30.0 pptg (from about 0.01 to about 3.4 kg/m$^3$) based on the total volume of fluid.

13. An aqueous fluid comprising water;

at least one guar or derivatized guar polymer capable of forming an aqueous gel;

at least one aminocarboxylic acid or a salt thereof in an amount effective to subsequently act directly on the polymer to break down the gel; and the absence of a crosslinker, where the aminocarboxylic acid is selected from the group consisting of ethylenediaminetetraacetic acid (EDTA), propylenediaminetetraacetic acid (PDTA), hydroxyethylenediaminetetraacetic acid (HEDTA), nitrilotriacetic acid (NTA), ethylenediaminetriacetic acid (HEDTA), ethylenediaminediacetic acid (H$_2$EDDA), dihydrate ethylenediaminediacetic acid (2H$_2$O EDTA), salts of these acids, and mixtures thereof wherein the aqueous gel is not crosslinked and said aqueous fluid is in the absence of a crosslinker.

14. The fluid of claim 13 where the aminocarboxylic acid is selected from the sodium salt, the potassium salt, and the ammonium salt of the acid.

15. The fluid of claim 13 where in adding the aminocarboxylic acid, the amount of aminocarboxylic acid added ranges from about 0.1 to about 30.0 pptg (from about 0.01 to about 3.4 kg/m$^3$) based on the total volume of fluid.

* * * * *